United States Patent
Park et al.

(10) Patent No.: US 11,797,207 B2
(45) Date of Patent: Oct. 24, 2023

(54) BASE AND COMPRESSED DIFFERENCE DATA DEDUPLICATION

(71) Applicant: CORNELL UNIVERSITY, Ithaca, NY (US)

(72) Inventors: Sungbo Park, Sunnyvale, CA (US); Gookwon Edward Suh, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 17/393,324

(22) Filed: Aug. 3, 2021

(65) Prior Publication Data

US 2022/0035546 A1 Feb. 3, 2022

Related U.S. Application Data

(60) Provisional application No. 63/060,665, filed on Aug. 3, 2020.

(51) Int. Cl.
*G06F 3/06* (2006.01)

(52) U.S. Cl.
CPC ............ *G06F 3/0641* (2013.01); *G06F 3/061* (2013.01); *G06F 3/0653* (2013.01); *G06F 3/0679* (2013.01)

(58) Field of Classification Search
CPC ...... G06F 3/061; G06F 3/0641; G06F 3/0653; G06F 3/0679; G06F 12/1081
See application file for complete search history.

(56) References Cited

U.S. PATENT DOCUMENTS

| | | | |
|---|---|---|---|
| 9,229,853 B2 | 1/2016 | Khan et al. | |
| 9,298,726 B1 | 3/2016 | Mondal et al. | |
| 9,436,596 B2 | 9/2016 | Sengupta et al. | |
| 9,460,102 B1 | 10/2016 | Bono et al. | |
| 9,524,104 B2 | 12/2016 | Chatterjee et al. | |
| 9,690,487 B2 | 6/2017 | Hayasaka et al. | |
| 9,921,773 B2 | 3/2018 | Georgiev | |
| 10,572,172 B2 | 2/2020 | Ippatapu | |
| 10,789,210 B2 | 9/2020 | Yan et al. | |
| 10,860,555 B2 | 12/2020 | Ippatapu | |
| 10,963,436 B2 | 3/2021 | Armangau et al. | |
| 2008/0050025 A1* | 2/2008 | Bashyam | H04N 19/172 382/233 |
| 2010/0082547 A1* | 4/2010 | Mace | G06F 16/1748 707/648 |

(Continued)

OTHER PUBLICATIONS

Zhou, Bing; Wen, Jiang-Tao, A Data Deduplication Framework of Disk Images with Adaptive Block Skipping, Jul. 31, 2016.

*Primary Examiner* — Larry T Mackall
(74) *Attorney, Agent, or Firm* — FisherBroyles, LLP; Gregory T. Fettig

(57) ABSTRACT

Systems and methods herein provide for data deduplication in memory. In one embodiment, an Input/Output (I/O) module is operable to process a write I/O request to the memory, and to extract data of the write I/O request. A data deduplication module is operable to access a table to identify a first portion of the data of the write I/O request that is stored at a first address of the memory, to assign a pointer to the first portion of the data in the table, to identify a second portion of the data of the write I/O request that is not stored in memory, and to direct the second portion of the data of the write I/O request to be written to a second address of the memory.

26 Claims, 14 Drawing Sheets

(56) References Cited

U.S. PATENT DOCUMENTS

| | | | |
|---|---|---|---|
| 2012/0109907 A1* | 5/2012 | Mandagere | G06F 16/215 707/E17.005 |
| 2016/0065540 A1* | 3/2016 | Androulaki | G06F 21/602 713/171 |
| 2016/0098353 A1* | 4/2016 | Shiu | G06F 3/0604 711/133 |
| 2016/0335024 A1* | 11/2016 | Zhong | G06F 3/061 |
| 2019/0026042 A1 | 1/2019 | Gupta et al. | |

* cited by examiner

```
Struct {
  int sold_time;
  int item;
  int customer;
  float price;
  ...
} Record Record A = {1573412115, 1537, 456, 100.5, ...};
Record B = {1573413201, 3568, 516, 120.3, ...};
```

| | | | | |
|---|---|---|---|---|
| A | 0x5dc8_5d13 (1573412115) | 0x0000_0601 (1537) | 0x0000_01c8 (456) | 0x42c90000 (100.5) | ... |
| B | 0x5dc8_6151 (1573413201) | 0x0000_0df0 (3568) | 0x0000_0204 (516) | 0x420a3d7 (120.3) | ... |

82 — A row
84 — B row

FIG. 4

BASE AND COMPRESSED DIFFERENCE DATA DEDUPLICATION

CROSS REFERENCE TO RELATED APPLICATIONS

This patent application claims priority to, and thus the benefit of an earlier filing date from, U.S. Provisional Patent Application No. 63/060,665 (filed Aug. 3, 2020), the contents of which are hereby incorporated by reference.

BACKGROUND

Hardware memory deduplication reduces main memory usage by storing just one copy of matching cache line blocks. Prior implementations of data deduplication involved using a translation table that maps a deduplicated memory address to the data. For example, if two blocks of data have the same value/data, that data is stored once in the memory and two entries (i.e., pointers) are generated in a translation table that points to where the data was written in the memory. Whenever a read Input/Output (I/O) request is made to the memory for that data, the translation table is accessed to retrieve the actual address of the deduplicated data via the pointer.

SUMMARY

Systems and methods herein provide for data deduplication in memory. In one embodiment, an I/O module is operable to process a write I/O request to the memory, and to extract data of the write I/O request. A data deduplication module is operable to access a table to identify a first portion of the data of the write I/O request that is stored at a first address of the memory, to assign a pointer to the first portion of the data in the table, to identify a second portion of the data of the write I/O request that is not stored in memory, and to direct the second portion of the data of the write I/O request to be written to a second address of the memory.

In another embodiment, the I/O module is further operable to process a read I/O request to the memory. And, the data deduplication module is further operable to locate the second portion of the data at the second address of the memory based on the read I/O request, to direct the I/O module to read the second portion of the data from the second address of the memory, to retrieve the pointer from the table, to locate the first portion of the data at the first address of the memory based on the pointer, to direct the I/O module to read the first portion of the data at the first address of the memory, and to direct the I/O module to link the first and second portions of the data. The I/O module then transfers the linked first and second portions of the data to fulfil the read I/O request.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 4 is an example of two cache lines that have the same structure in each cache line.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

Figure 1:
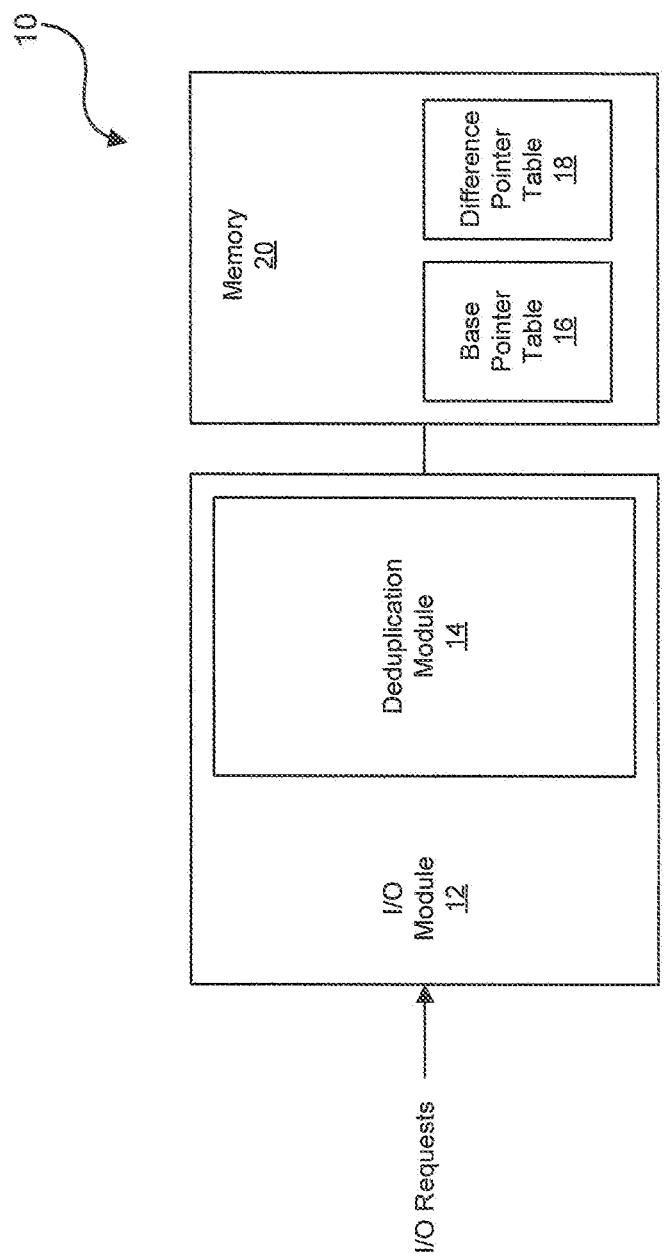
FIG. 1 is a block diagram of an exemplary memory system with data deduplication.

Generally, the embodiments herein provide for data deduplication in computer memory, such as dynamic random access memory (DRAM). However, the embodiments herein may also find advantageous uses in other types of storage devices, such as solid state storage devices (e.g., flash memory, etc.). Turning now to FIG. 1, a block diagram of an exemplary memory system 10 with Base and Compressed Difference (BCD) data deduplication is presented. In this embodiment, the system 10 is configured with an I/O module 12 that is operable to process I/O requests (i.e., read I/O requests and write I/O requests) to the memory 20. The I/O module 12 may be configured with a data deduplication module 14 that is operable to detect data already written to the memory 20 so as to prevent duplications of data in the memory 20.

For example, when the I/O module 12 processes a write I/O request to the memory 20, the deduplication module 14 may determine whether a portion of the data pertaining to the write I/O request has already been written to the memory 20. If so, the deduplication module 14 may generate a pointer to the location in the memory 20 where that portion of data has already been written. The deduplication module 14 may store that pointer in a base pointer table 16 such that the data may be quickly located upon a subsequent read I/O request. Then, for the remaining portion of the data of the write I/O request (e.g., the portion of data that is not already been written to the memory 20), the deduplication module 14 may direct the I/O module 12 to write that portion of data to the memory 20. The deduplication module 14 may generate a pointer to the location where that portion of the data is stored in the memory 20. The deduplication module 14 may then store the pointer in a difference pointer table 18.

Based on the foregoing, the I/O module 12 is any device, system, software, or combination thereof operable to process read and write I/O requests to the memory 20. And the deduplication module 14 is any device, system, software, or combination thereof operable to prevent data from being duplicated in the memory 20 (e.g., when deemed necessary). In some embodiments, the base pointer table 16 and the difference pointer table 18 can be combined into one address translation table to reduce the number of memory accesses. In this regard, the deduplication module 14 may know the physical address of the base pointer table 16 and the difference pointer table 18 in the memory 20 such that the deduplication module 14 may read and write to the base pointer table 16 and the difference pointer table 18. The base pointer table 16 and the difference pointer table 18 generally provide a mapping between addresses of I/O requests and the actual data addresses in the memory 20.

Figure 2:
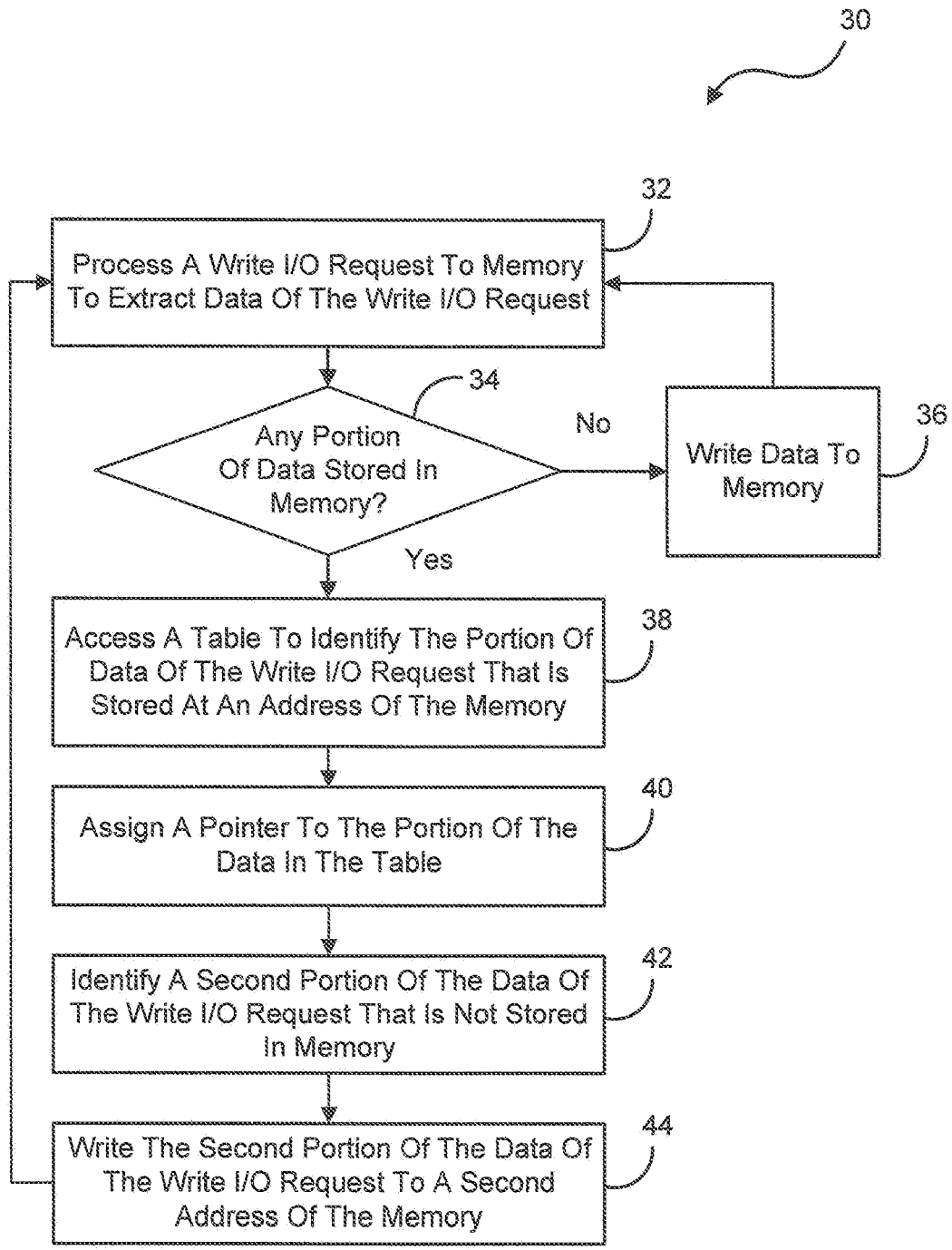
FIG. 2 is a flowchart of an exemplary write I/O process of the memory system.

With this in mind, FIG. 2 is a flowchart of an exemplary write I/O process 30 of the memory system 10. In this embodiment, the process 30 initiates with the I/O module 12 processing a write I/O request to the memory 20 to extract data of the write I/O request, in the process element 32. In response to the data being extracted from the write I/O request, the data deduplication module 14 may determine whether any portion of the data in that request is stored in the memory 20, in the process element 34. If no portion of the data in the request is stored in the memory 20, the I/O module 12 writes the data to the memory 20, in the process element 36, and returns to process the next write I/O request (and/or a read I/O request) in the process element 32. Alternatively or additionally, the deduplication module 14 may assign a pointer to this data in the base pointer table 18. For example, the difference pointer table 18 stores pointers to portions of data that are different. But, when the data of a write I/O request is not partially matched (i.e., all of the data is different), the deduplication module 14 writes the data to the memory 20 as a new base data and assigns a pointer to the base data in the base pointer table 16. Then, on a subsequent write I/O request to another address that has partially matching write data, this base data can be used by the deduplication module 14 for deduplication.

If a portion of the data is stored in the memory 20, the deduplication module 14 may access the base pointer table 16 to identify the portion of the data of the write I/O request that is stored at an address of the memory 20, in the process element 38. Then, the deduplication module 14 may assign a pointer to that portion of the data, in the process element 40, to quickly locate the data upon a subsequent read I/O request. The deduplication module 14 may identify the remaining portion of the data of the write I/O request as not having been written (i.e., stored) to the memory 20, in the process element 42. The deduplication module 14 may then direct the I/O module 12 to write the remaining portion of the data of the write I/O request to another address of the memory 20, in the process element 44. In this regard, the deduplication module 14 may note the second address of the memory 20 for that portion of the data by generating a pointer that is stored in the difference pointer table 18 such that the data may be quickly accessed upon a subsequent read I/O request.

To summarize, when a write I/O request is issued, the deduplication module 14 initially tries to find a data entry that matches the written data in the memory 20. If the deduplication module 14 finds a matching entry, the base pointer table 16 is set to point to the existing value and the new data of the write I/O request is written to another location. If the deduplication module 14 does not find a match, the deduplication module 14 writes a new data block into the memory 20 and updates the base pointer table 16 (or the address translation table) to point to the newly written data.

In some embodiments, the deduplication process may be performed for multiple write I/O requests. For example, upon a first write I/O request, the deduplication module 14 may store only a portion of the data in the memory 20 that is different from previously stored data. The other portion of data of the write I/O request may be pointed to with a pointer if that portion of data already resides within the memory 20. Then, upon a second write I/O request, the deduplication module 14 may again store only a portion of the data in the memory 20 that is different. And, if there is a portion of data that is the same as that previously stored in the memory 20 and that of the first write I/O request, then the deduplication module 14 may assign another pointer to that portion of the data of the second write I/O request. Accordingly, the embodiments herein are not intended to be limited to any number of pointers assigned to previously stored portions of data in the memory 20.

Figure 3:
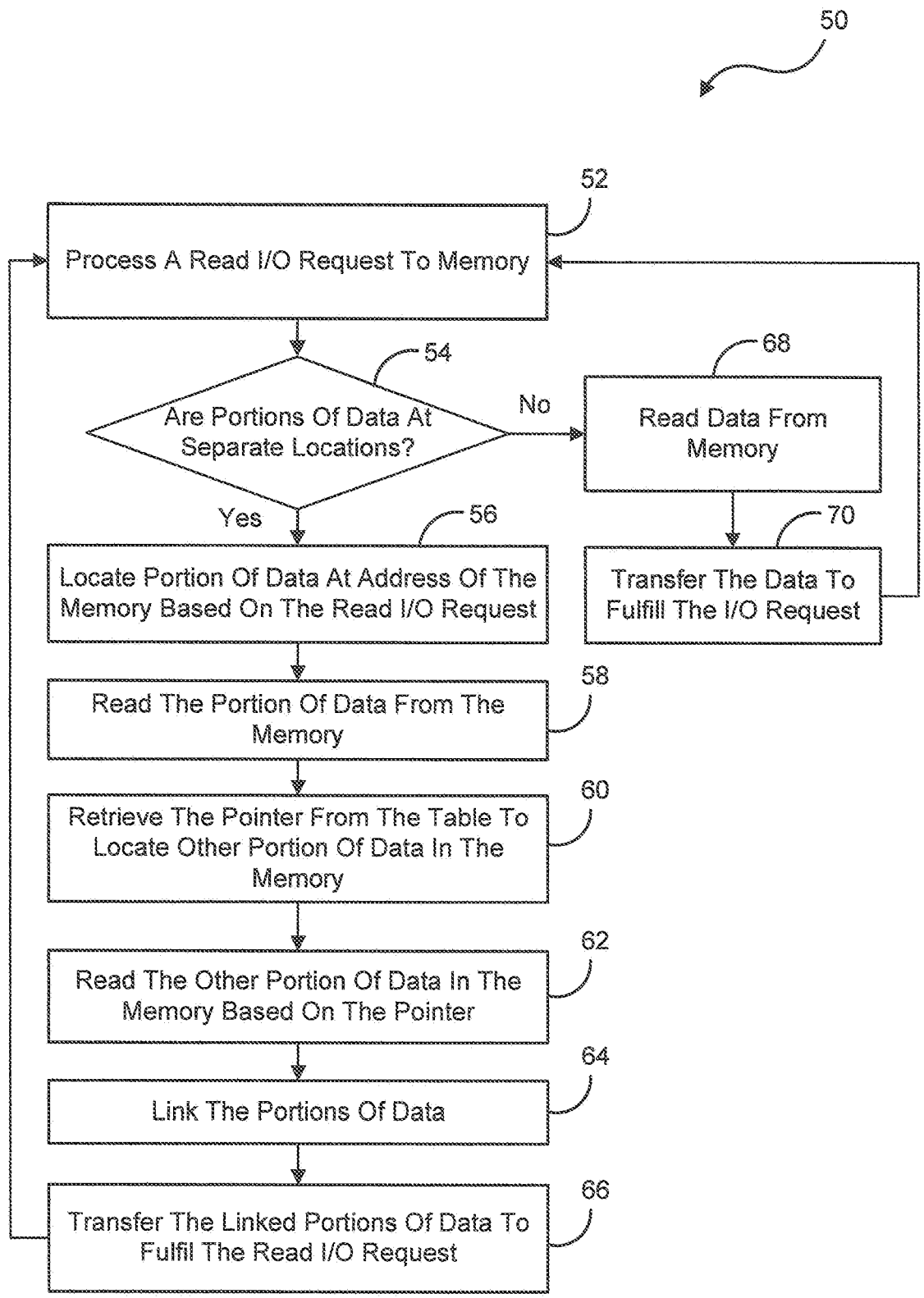
FIG. 3 is a flowchart of an exemplary read I/O process of the memory system.

FIG. 3 is a flowchart of an exemplary read I/O process 50 of the memory system 10. In this embodiment, the process 50 initiates when the I/O module 12 processes a read I/O request to the memory 20, in the process element 52. The deduplication module 15 may then determine whether portions of the requested data are stored at separate locations (i.e., memory addresses), in the process element 54. If not, the I/O module 12 may read the data from the memory 20, in the process element 68, and transfer the data to fulfill the I/O request, in the process element 70. In doing so, the deduplication module 14 may access the base pointer table 16 to locate the data in the memory 20 such that the I/O module 12 can read the data. Then, the I/O module 12 may return to process another read I/O request (or a write I/O request), in the process element 52.

If, however portions of the requested data portions are stored at separate locations, the deduplication module 14 may locate a portion of the data at an address of the memory 20 where that portion of data was written based on the read I/O request, in the process element 56. For example, the read I/O request may include the address (logical and/or physical) of a portion of data written in the memory 20 such that the I/O module 12 can retrieve that portion of the data. Alternatively or additionally, the deduplication module 14 may access the base pointer table 18 to retrieve the pointer to that location such that the I/O module 12 can retrieve that portion of the data from the memory 20. For example, the portion of data of the read I/O request may not have existed in the memory 20 at the time of the write I/O request. That is, the portion of data was not a duplicate of another portion of data in the memory 20 at the time of writing. Accordingly, that portion of data was stored at an address in the memory 20 and pointed to by a pointer existing in the difference pointer table 18.

The deduplication module 14 may also retrieve the pointer from the base pointer table 16 to retrieve the remaining portion of the data of the read I/O request, in the process element 60. For example, the base pointer table 15 may store pointers to locations where portions of data of multiple write I/O requests are the same (i.e., duplicated). In these instances, the deduplication module 14 may access the base pointer table 16 to retrieve the pointer associated with that data such that the I/O module 12 can locate and read the other portion of the data from the memory, in the process element 62, based on the pointer. Once the portions of data are read from the memory 20, the I/O module 12 may link the portions of data together, in the process element 64, and transfer the linked portions of data to fulfill the read I/O request, in the process element 66.

It should be noted that the process elements of the various processes described herein may be performed in alternative orders. For example, the process elements 56 and 58 may be performed after the process elements 60 and 62, or the process elements 56 and 58 may be performed in parallel with the process elements 60 and 62. Accordingly, the process embodiments herein are not intended to be limited to any particular order.

Searching the entire memory 20 can take a significant amount of time and cause latencies. To quickly find the same data line, a hash value of an entire block of data may be generated and used to consolidate data entries of the matching hash value to a single "bucket". Thus, whenever new data is written, the hash value of that data may be used to locate the bucket that has matching data entry. To further reduce the search time, a small signature value of each data entry may be kept in the bucket and used to find potentially matching data entries before the entire block data is compared to other data blocks in the memory 20. Each bucket may also keep a reference count of the number of table entries (e.g., in the base pointer table 16 and in the difference pointer table 18) that point to each data entry. And, the deduplication module 14 may use the reference count to evict unreferenced data.

To illustrate, one variable of an array, a data structure, or a class may tend to have values within a limited range. This means that high bits of 4B or 8B data often have the same value in the same data structure. Cache line level compressions may leverage this nature of the data structure, which works well when every unit of data in a cache line is the same. For example, if an array that has 16 integers (e.g., 4B each), is stored in a cache line, and all of the integers represent customers' ages, all of the 4B integers typically range from 0 to 120. Thus, the cache line can be efficiently compressed.

However, if the cache line consists of different kinds of variables (e.g., like variables of a data structure), the cache line cannot be effectively compressed. FIG. 4 represents an example of two cache lines 82 and 84 that have the same structure in each cache line. In this case, the high bits (i.e., in bold) are the same in both cache lines. But the cache lines 82 and 84 cannot be compressed by cache line level compressions. Also, these cache lines cannot be deduplicated by conventional deduplication algorithms due to the small difference between the cache lines 82 and 84. This redundancy in the high bits between the cache lines 82 and 84 is common in many workloads.

The embodiments herein provide granularity for data deduplication. For example, in conventional deduplication, when two cache lines are exactly the same, the cache lines can be deduplicated. However, when the cache lines are somewhat different, conventional deduplication cannot be performed. The embodiments herein deduplicate similar cache lines even if two cache lines are not exactly matched. For example, when writing a new cache line, if two cache lines partially match, the difference between two cache lines is written in the memory 20. However, the embodiments herein are also operable to perform conventional deduplication when two cache lines have the same data.

Figure 5:
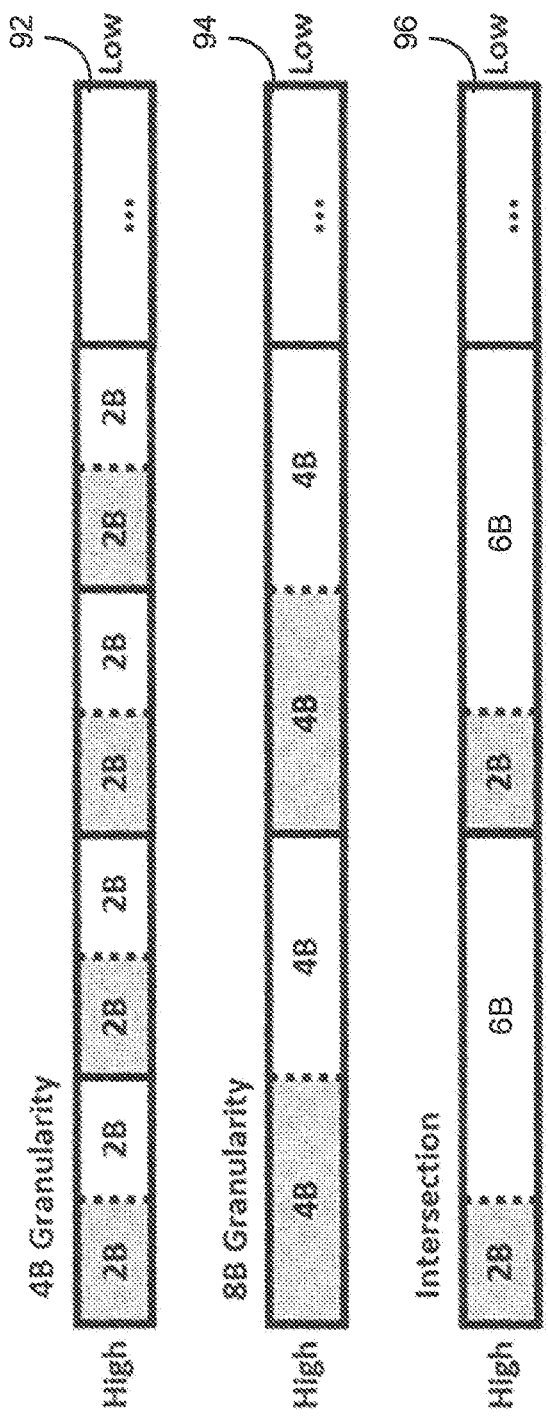
FIG. 5 illustrates cache lines with differing levels of deduplication granularity where partial matches between cache lines may be deduplicated, in one exemplary embodiment.

The granularity of the deduplication can be set as a matter of design choice. FIG. 5 illustrates cache lines 92, 94, and 96 with differing levels of deduplication granularity where partial matches between cache lines may be deduplicated. For example, cache line 92 shows high 2B granularity out of every 4B. Cache line 94 shows high 4B granularity out of every 8B. And, cache line 96 shows an intersection between the cache lines 92 and 94 where portions of the data are the same and other portions of the data are different. In these embodiments, shaded portions of the cache lines are compared (e.g., on a write I/O request by write I/O request basis) to decide whether a partial match exists. Generally, these are the most commonly reused bits and increase the probability of a partial match. And, if the deduplication module 14 determines a partial match on a write I/O request, compression may be attempted once the difference between the cache lines is determined to avoid duplication of data, as compression may change the value of the data. For example, assuming the high 2B out of every 8B is designated for partial match determinations as shown in cache line 96, a partial match would mean that at least 16B are the same between two cache lines. To avoid writing the same bits, leading-zero compression (LZC) may be applied to the difference between two cache lines.

Figure 6:
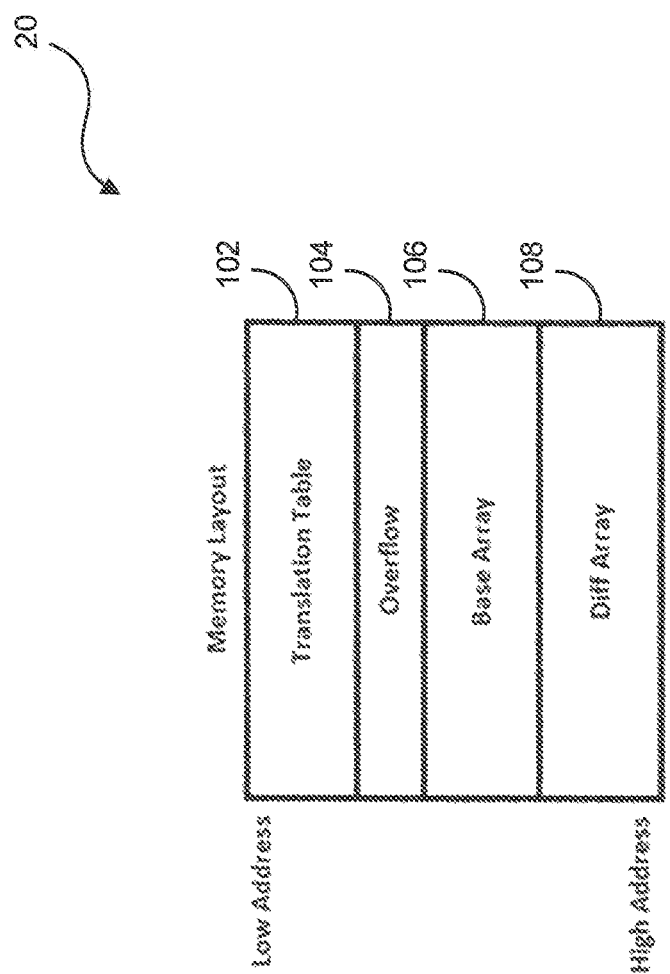
FIG. 6 illustrates a memory being partitioned into three regions at initialization by a deduplication module, in one exemplary embodiment.

FIG. 6 illustrates the memory 20 being partitioned into four regions at initialization by the deduplication module 14, in one exemplary embodiment. Region 102 includes a translation table and region 104 includes an overflow area. Region 106 is established as a base array that maintains the base data (e.g., the same data of multiple cache lines with pointers that point to that data). And, region 108 is established as a difference array that maintains the difference pointers (e.g., the differing data of multiple cache lines with pointers that point to that data). For each write I/O request, the portion of a cache line designated for partial match may be hashed to select a "bucket" of the base array 106. Since a hash value of the same data is also the same, cache lines with matching portions may be stored in the selected bucket. If one portion of the data in the bucket is fully matched with new write data, the cache line is deduplicated. If one portion of the data in the bucket is partially matched with new write data, the deduplication module 14 may compute the difference and LZC compress the data. After compression, the I/O module 12 may write the compressed value in the difference array of region 108.

The difference array of the region 108 may include many buckets that have several "ways" into each bucket. For example, one bucket may be selected by the hash value of the difference, either compressed or uncompressed. If a way into the bucket matches the compressed or uncompressed difference, that data may be deduplicated. Otherwise, the value is stored in a different bucket of the difference array. Since the location where a base or a difference is stored can change for each write I/O request, the address is generally tracked. And, the translation table of region 102 may retain translation mapping for subsequent read and write I/O requests.

Figure 7:
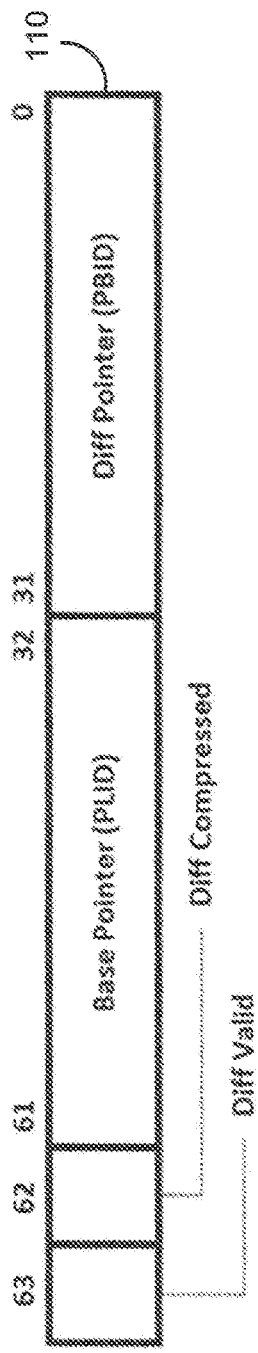
FIG. 7 illustrates a translation table, in one exemplary embodiment.

FIG. 7 illustrates a translation table 110 in one exemplary embodiment. The translation table 110 may provide logical addresses that can be used by a processor and/or on-chip caches before the deduplication is performed as described herein. The logical addresses generally do not correspond to the actual physical locations in the memory 20. To represent the actual physical location in the memory 20, a physical line identification (PLID) and a physical block identification (PBID, e.g., 16B) may be used. For example, when assuming a 64 GB (Gigabyte) memory layout, each entry of the translation table 110 may have 64 bits. And, as shown in FIG. 7, these bits may be formatted into four fields including a difference valid bit, a difference compressed bit, a base pointer ID, and a difference pointer ID. The base pointer ID has the PLID that points to the base value of data in the memory 20. The difference pointer ID has the PBID that points to the difference value of data in the memory 20. The granularity of the PBID can be changed depending on the implementation (e.g., 2B, 4B, 8B, 16B, etc.). The difference pointer is valid when the difference valid bit may be set and partial deduplication is used. And, the difference compressed bit may be set when the difference value indicates compressed data (e.g., 16B or 32B). If the difference compressed bit is unset, the difference value indicates uncompressed data (e.g., 48B).

Figure 8:
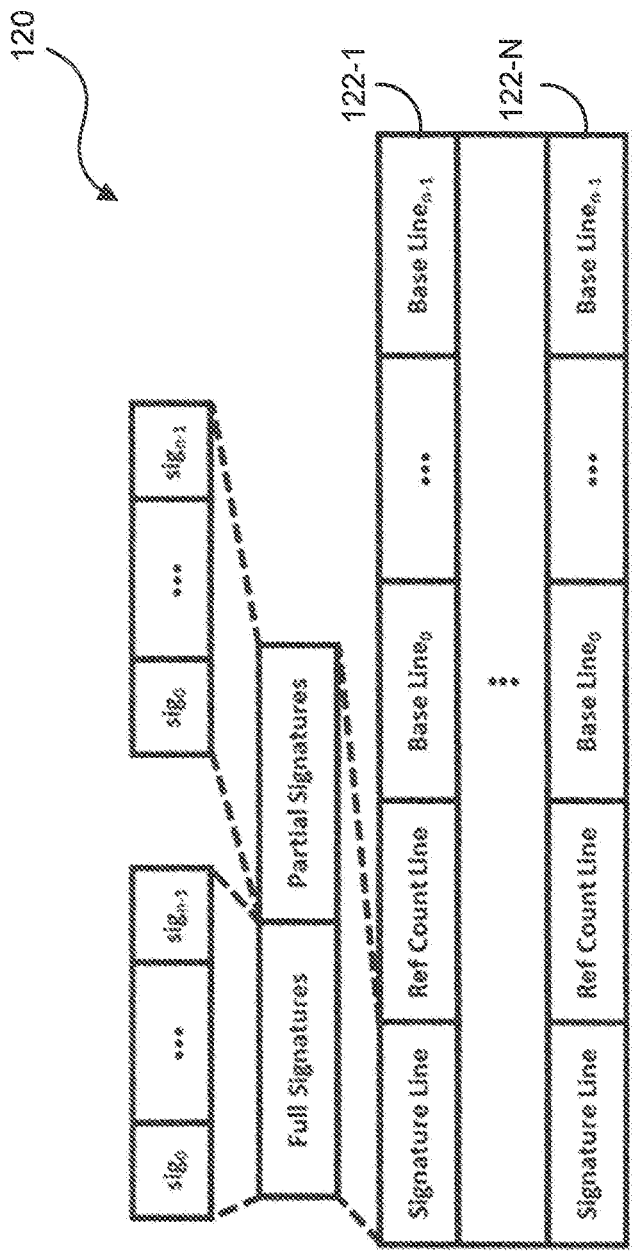
FIG. 8 illustrates a base array comprising multiple "buckets" with each bucket containing multiple "ways", in one exemplary embodiment.

FIG. 8 illustrates a base array 120 comprising multiple buckets 122-1-122-N (where the reference "N" is an integer greater than "1" and not necessarily equal to any other "N" reference designated herein) with each bucket 122 containing multiple ways, in one exemplary embodiment. When a cache line is written (e.g., to place similar cache lines in the same bucket), the designated bits of the cache line for partial matching may be hashed to decide which bucket 122 they are placed in (e.g., by bucket ID). For example, assume that there are 32 ways into a bucket 122 to place both full signatures and partial signatures in a cache line. The full signature may be a one-byte hash value of a cache line and the partial signature may be a one-byte hash value of the partial bits of the designated location. Additional partial signatures can be used to find similar cache lines using different designated partial bits. The ways' full signatures and partial signatures may be compared to a new cache line's signature before reading the data of the cache line by comparing actual data (64B in this example) to reduce the number of cache line reads. A reference count line may include reference counters of the ways. And, the reference counter may be 1B or 2B.

Figure 9:
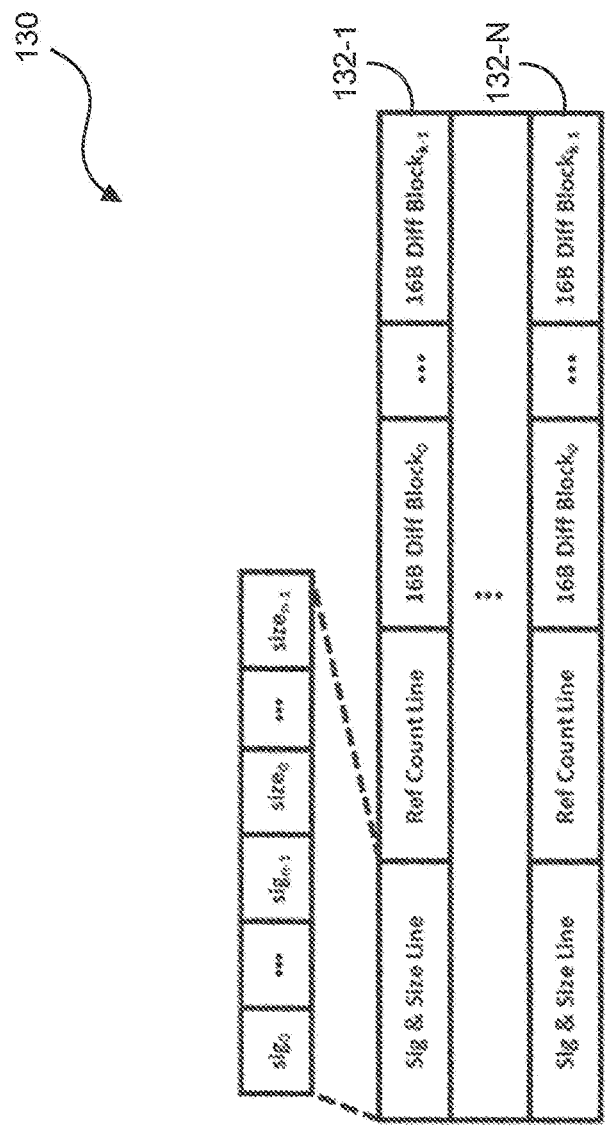
FIG. 9 illustrates a difference array comprising multiple buckets, in one exemplary embodiment.

FIG. 9 illustrates a difference array 130 comprising multiple buckets 132-1-132-N, in one exemplary embodiment. Unlike conventional deduplication, the deduplication embodiments herein may be configured with the difference array 130 to store uncompressed or compressed difference values. For example, if the matched high bits are 16B, the uncompressed difference is generally 48B. If the LZC compressed value is lower than 32B or 16B, a 32B or a 16B bucket may be used to store the value, although such granularity may be implemented as a matter of design choice. The difference array 130 may include multiple minimum size blocks (e.g., 16B) and one or more blocks can be used as a way to support different sizes (e.g., 16B, 32B, 48B, etc.). One bucket 132 may include several ways for difference values, one or more signatures, and one or more size lines. For example, the signature and size lines may include a 1B signature and a 2-bit size information for each way, subject to a matter of design choice. Also, size information may be stored in a separate cache line instead of storing both signature and size in a cache line. The reference count line includes a reference count of each way. Also, the signature and size in a cache may include an expansion bit representing that the last 4 blocks that are used for a second signature and size in a cache to provide more ways into the bucket 130 when most of difference values are 16B.

Figure 10:
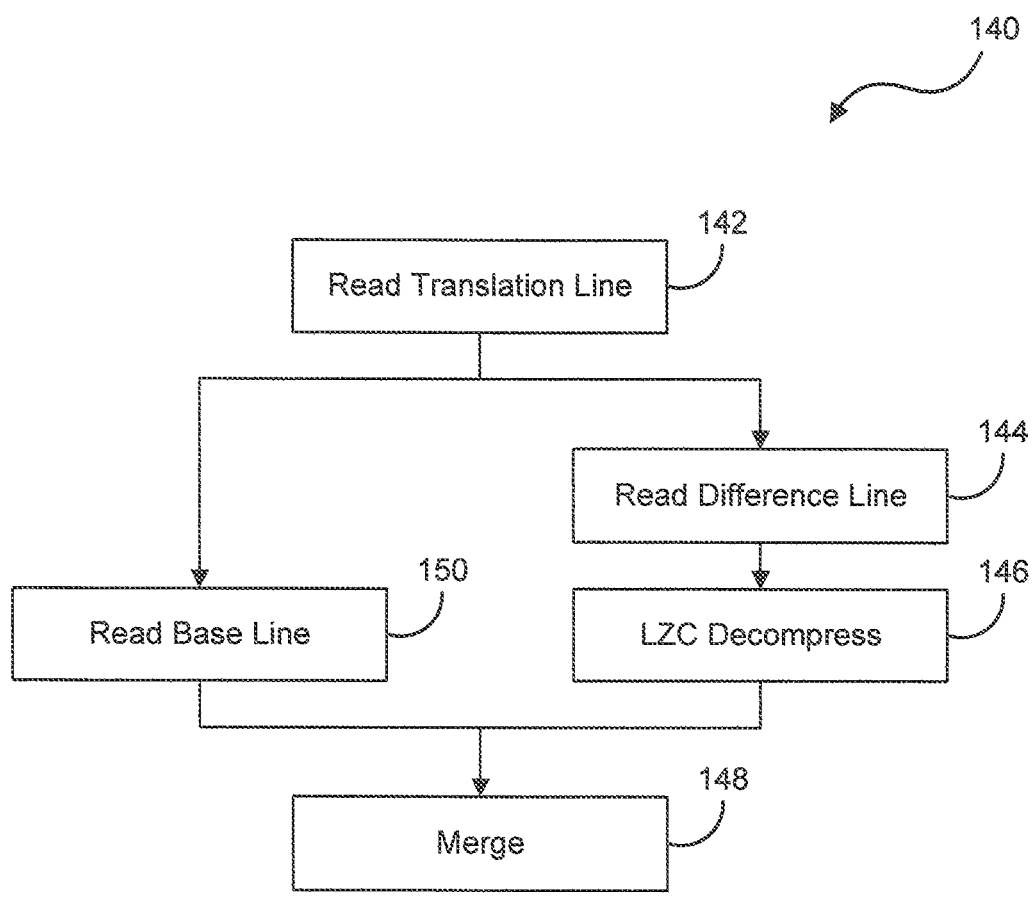
FIGS. 10, 11A and 11B illustrate other exemplary processes of the memory system.

FIG. 10 illustrates another exemplary process 140 of the memory system 10. In this embodiment, a read I/O request sequence initiates with a reading of a translation table line, in the process element 142. The rest of the read sequence may be decided depending on whether a difference valid bit and a difference compressed bit from the translation table entry are implemented. If the difference pointer is not valid, the base line is read, in the process element 150. If the difference pointer is valid, the difference line may be accessed and read, in the process element 144. If the difference line is compressed, the difference is decompressed before merging, in the process element 146. Then, the difference value is merged with the base value using an XOR operation, in the process element 148. Although read requests require additional DRAM accesses, most accesses to the translation table can be removed by the translation table cache. The read request to the difference line may be issued simultaneously with the read request to the base line. And the decompression and the merge operations create a relatively small amount of latency.

Figure 11A:
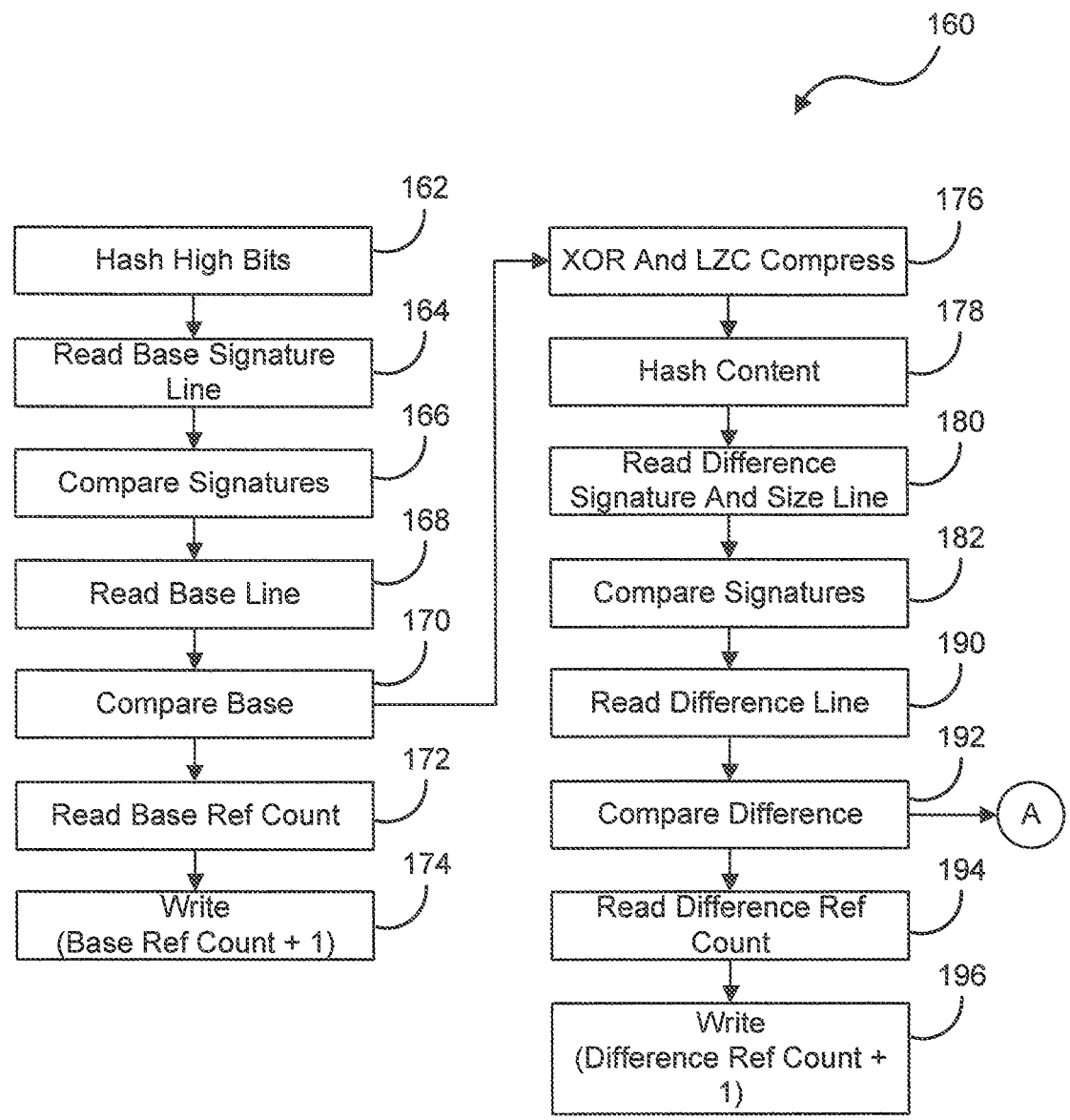
Figure 11B:
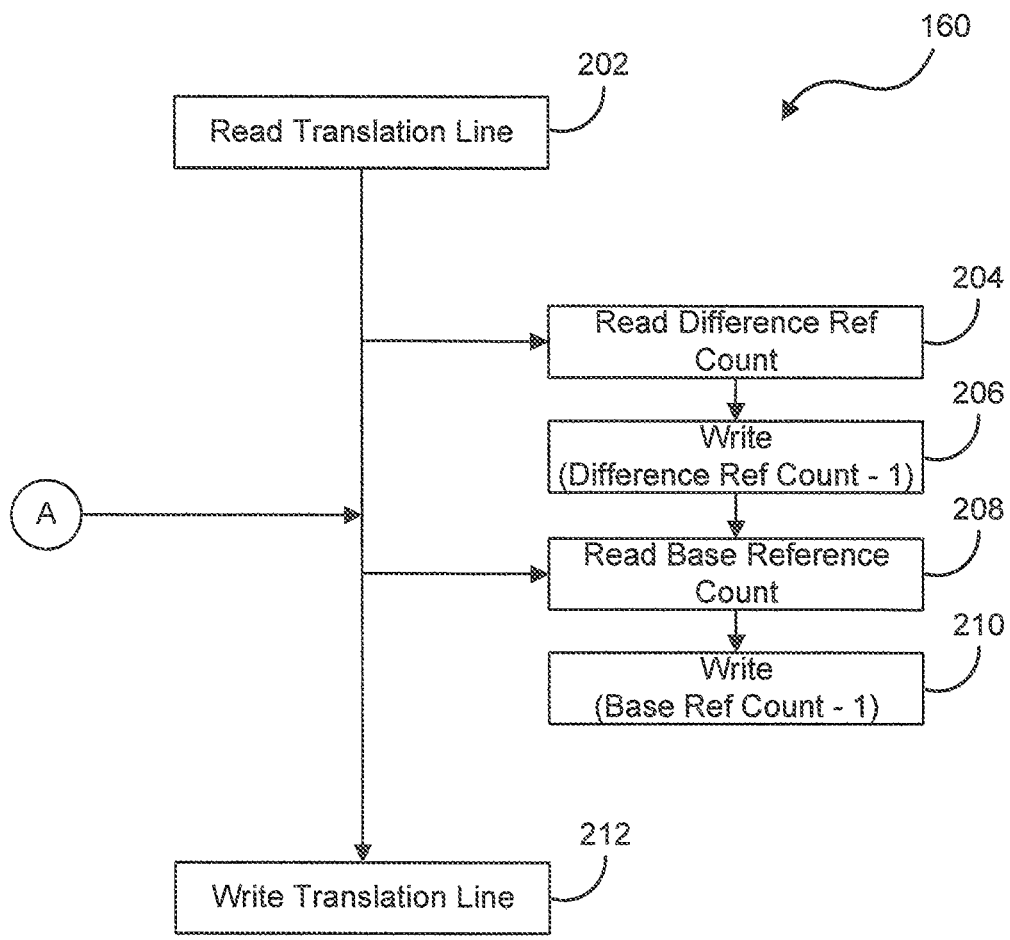

FIGS. 11A and 11B illustrate another exemplary process 160 of the memory system 10. In this embodiment, three different results of a base array lookup exist: a full match; a partial match; and a miss. Depending on the result, the write sequence is different. For example, a full match and a miss generally have the same write sequence as conventional deduplication. However, for a partial match, a difference array lookup is used to find the same difference value. Before the lookup, LZC compression may be performed on the difference value. Additionally, to keep the structures for deduplication up to date, the pointers of the translation table entry may be updated and the reference counts of stale base and difference data are decreased. FIGS. 11A and 11B illustrate the write sequence for the partial match case with a hit in the difference array. Since one write generates multiple memory accesses, a set of optimizations may be used to reduce bandwidth.

With this in mind, a write I/O request sequence initiates with a review of the hash high bits described above, in the process element 162. From there, the deduplication module 14 may direct the I/O module 12 to read the base signature line, in the process element 164. Then, the deduplication module 14 may compare the signature of the data of the write I/O request to the base signature lines, in the process element 166. If the signature produces a match, the deduplication module 14 may direct the I/O module 12 to read the base cache line, in the process element 168, to perform deduplication of the base data of the write I/O request. In this regard, the deduplication module 14 may compare the base data of the write I/O request to that of the located base data in the memory 20, in the process element 170. In the process element 172, the deduplication module 14 may read the base reference count and then increment/store (e.g., write) the base reference count, in the process element 174, to keep track of the number of base reads.

From there, the deduplication module 14 may XOR and LZC compress the difference data of the write I/O request, in the process element 176, and hash the contents thereof, in the process element 178. The deduplication module 14 may then read the difference signature and size line as described above, in the process element 180, to compare the signatures of the difference data of the write I/O request, in the process element 182. The deduplication module 14 may then direct the I/O module 12 to read the difference line, in the process element 190, to compare the difference between the data of the write I/O request and the difference line, in the process element 192. Upon doing so, the deduplication module 14 may read the difference reference count, in the process element 194, and increment/store (e.g., write) the difference reference count, in the process element 196, to keep track of the number of difference reads.

Based on the comparison difference of the process element 192, the deduplication module 14 may read the translation line as described above, in the process element 202, illustrated in FIG. 11B. The deduplication module 14 may then read the difference reference count, in the process element 204, and decrement the read difference reference count, in the process element 206. The deduplication module 14 may then read the base reference count, in the process element 208, and decrement that count, in the process element 210. Afterwards, the deduplication module 14 may direct the I/O module 12 to write the translation line, in the process element 212.

To illustrate, the I/O module 12 may write a value into one address where previously stored data at the address comprised a different value. The base pointer and difference pointer were pointing to the different value. Thus, if those pointers are replaced with the new pointers for the new value by a translation line write (i.e., process element 212), the reference counts of the base and difference for new value decrease. So, the reference count from the process elements 204, 206, 208, 210 are for the previously written value. The previously written data was not overwritten in the memory 20. Rather, it is still pointed to by other pointers of other addresses. And, the reference count is decreased instead of removing the data from the memory 220.

Figure 12:
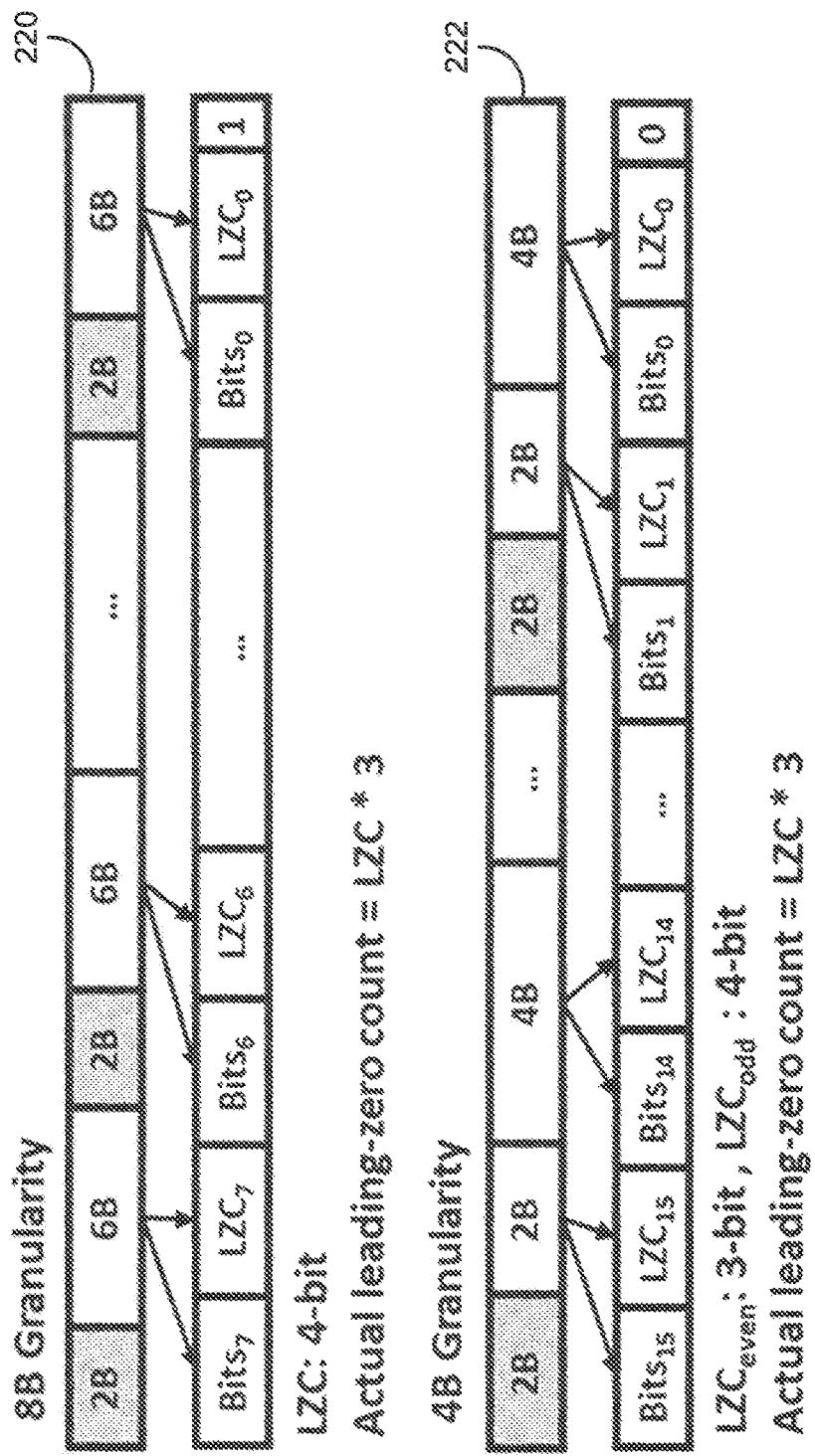
FIG. 12 illustrates one exemplary LZC compression of deduplication and selection of deduplication granularity.

FIG. 12 illustrates one exemplary LZC compression of deduplication and selection of deduplication granularity shown and described herein. In this embodiment, two cache lines 220 and 222 are illustrated with differing levels of deduplication granularity, 8B and 4B, respectively. In the cache lines 220 and 222, the first bit of the compressed form indicates the granularity of the deduplication. For example, a value of "1" may indicate a granularity of 2B deduplication out of every 8B in the cache line 220. And, a value of "0" may indicate a granularity of 2B deduplication out of every 4B in the cache line 222. Again, different cache lines that share the same base data can reuse a designated portion of the cache line for a partial match (e.g., the shaded portions). Since the high bits of each 4B or 8B data tend to have the same values with a partially matched cache line, the high bits of the difference data/values between two cache lines tend to have fewer or zero matches. For example, 4B out of every 8B in the cache line 220 and 2B out of every 4B in the cache line 222 tend to have the same values. LZC compression may be used with each of the two different granularities to provide a higher compression ratio.

For example, for the 8B granularity, each 6B data may be compressed into the leading zero count bits and the remaining bits. And, the number of successive zeros may include the LZC value*3, or the maximum bit counts if the LZC value*3 is larger than the maximum zero counts. For the 4B granularity, the odd 4B and even 4B may be treated differently because the 2 B of the odd 4B are zero. More specifically, when two cache lines are partially matched, the two cache lines have the same high 2B out of every 8B (see e.g., line 96 of FIG. 5). With this in mind, if 4B granularity LZC is used, 8B comprises two 4B blocks. And, the first 4B's high 2B matches between the two cache lines. For the second 4B, matching between two cache lines may or may not exist. Thus, they may be considered different.

In some embodiments, the effectiveness of multiple types of compression within BCD depends on the application characteristics. For example, some address ranges have frequent writes that do not have much data reuse and, as such, may incur significant overhead with a small savings in memory. For other address ranges, the deduplication techniques herein may increase both compression ratio and performance. To limit the performance overhead, the embodiments herein may selectively enable deduplication for different address ranges at runtime.

The deduplication module 14 may employ hardware performance counters to estimate the benefit (e.g., compression ratio) and the cost (e.g., added memory accesses and memory pressure) of deduplication for each address range. If the estimated cost is higher than the estimated benefit over a period, the deduplication module 14 may be disabled. Accordingly, the selective deduplication may support one of the following three BCD modes for each address range: deduplicate both base and difference (BCD); only deduplicate base, not difference (e.g., a "BCD light" mode); and no deduplication (e.g., a BCD disabled mode). After running in a BCD light mode or BCD disabled mode for a period of time with a certain number of memory accesses, full BCD deduplication may be re-enabled to estimate the benefit and the cost again and adopt to application behavior changes.

To illustrate, 4 MB granularity is assumed for the selective deduplication. The following analysis illustrates how the proposed selective deduplication scheme estimates the cost and the benefit of deduplication.

$$Benefit_{AoverB} = \frac{CompRatio_A}{CompRatio_B} - 1 \cong \frac{MemUsage_B}{MemUsage_A} - 1$$

$$Cost = k * \left( \frac{Write}{Write + Read} * WriteCost + \frac{Read}{Write + Read} * ReadCost \right)$$

$$WriteCost = AdditionalMemAccPerWrite * \left( \frac{MC \text{ Queue Valid}}{MC \text{ Queue Depth}} + \alpha \right)$$

$$ReadCost = AdditionalMemAccPerRead * \left( \frac{MC \text{ Queue Valid}}{MC \text{ Queue Depth}} + \alpha \right) +$$

$$AdditionalLatencyPerRead * \beta$$

At a high level, the benefit as an improvement in the compression ratio, and the cost as a product of the additional metadata memory accesses and the current memory pressure are estimated. To estimate the compression ratio, on each write, the performance monitor may count the number of bytes in memory that would be used for each mode. For example, the base memory usage may be estimated as 64B per write. The memory usage for the BCD light mode may be estimated by adding the size of the difference even when it is deduplicated.

The cost may be estimated as a weighted sum of the write cost and the read cost. Also, to appropriately scale the cost, a parameter k is multiplied. If k is high, the scheme may be more conservative so as to prioritize limitations on performance overhead. If k is low, the compression ratio may be prioritized. The write cost is generally a product of additional memory accesses and the current memory pressure. Another parameter may be used to make the cost non-zero even when there is no memory pressure. For the cost of using BCD over the BCD disabled mode, memory accesses except for base accesses may be counted. And, for the cost of the BCD light mode over the BCD disabled mode, memory accesses except for base lines and difference related metadata may be counted. The read cost generally comprises the bandwidth overhead and the latency overhead. The bandwidth overhead may be estimated by additional memory accesses per read. The latency overhead may be estimated as the product of another parameter and the translation table miss rate for reads.

The performance counters, for each address range, count reads, writes, memory usage for writes in BCD, memory usage for writes in the BCD light mode, memory accesses for writes (e.g., except for base lines), memory accesses for writes (e.g., except for base lines and the difference array), and memory accesses to translation lines for reads. In a 64 KB SRAM, performance counters for each 4 MB address range may be used for 16 GB memory without aliasing.

Figure 13:
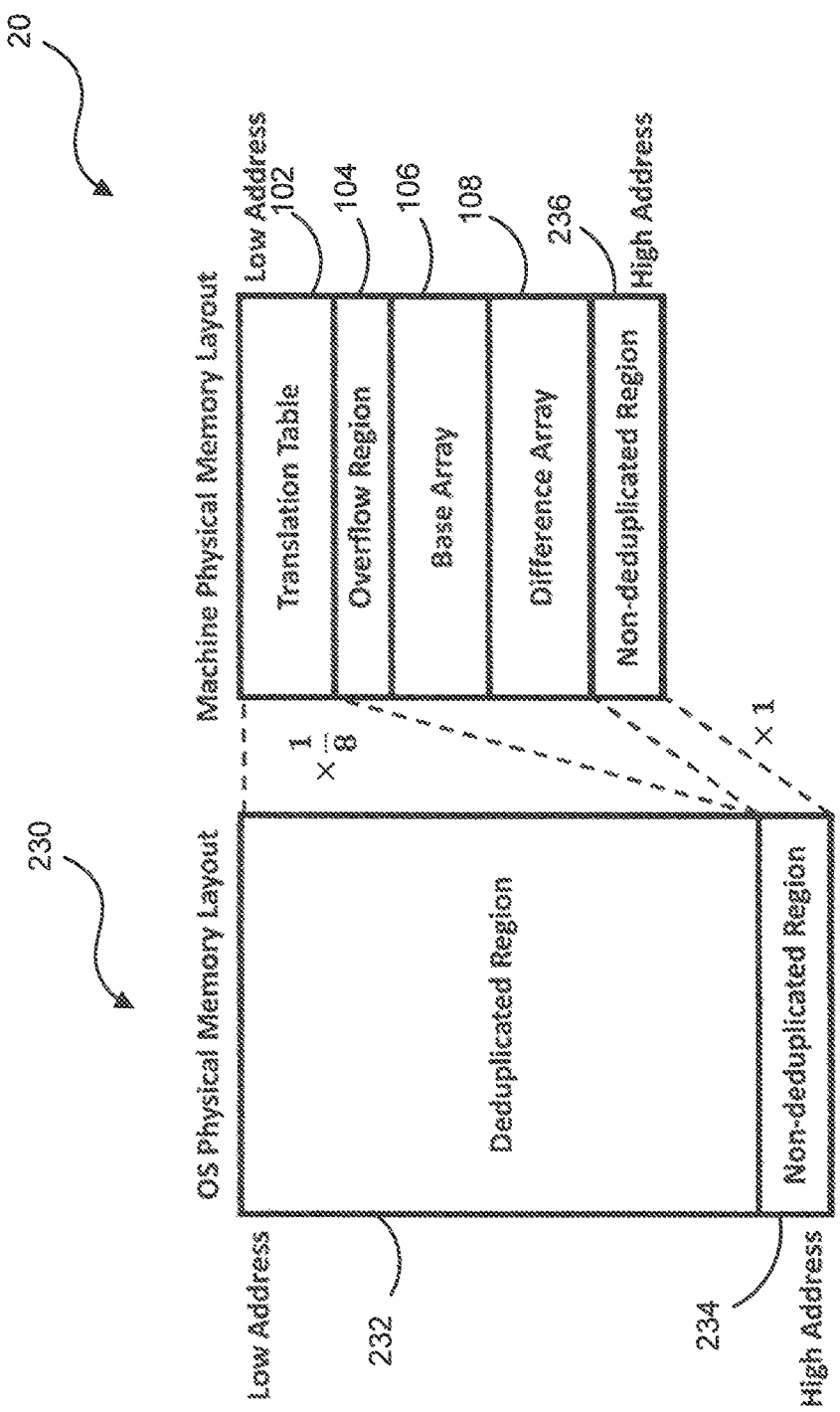
FIG. 13 illustrates an operating system's physical memory space corresponding to a memory, in one exemplary embodiment.
Figure 14:
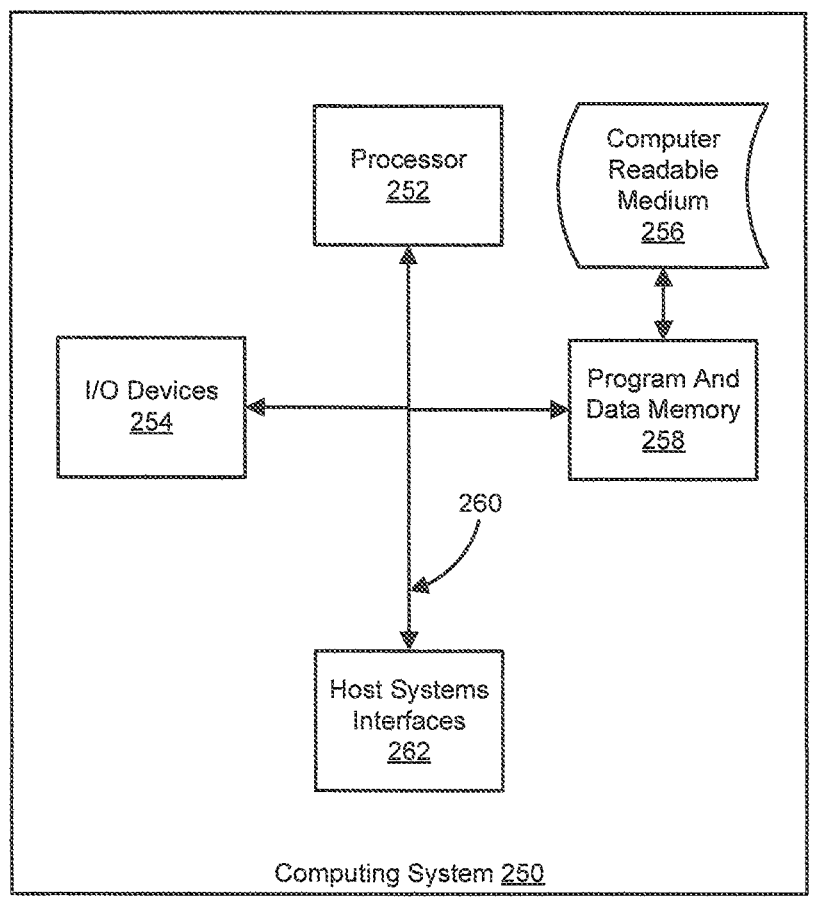
FIG. 14 is a block diagram of an exemplary computing system in which a computer readable medium provides instructions for performing methods herein.

Some workloads do not have enough redundancy in difference values for deduplication to be effective. So, deduplicating difference values would entail multiple memory accesses to search for a match and update metadata on a write I/O request. For example, in an application that repeated writes I/O requests of different values to one memory location, the MPAs (Machine Physical Addresses) would be changed for each write because the locations of the difference line, signature line, and reference counter line are decided by the hash of the difference value. Even writes to one OS (operating system) physical address may incur a large number of last level cache (LLC) misses. Thus, it may be beneficial to turn off difference deduplication in certain cases. In the BCD light mode, base values are deduplicated and compressed difference values are stored in the overflow region 104 as illustrated in FIG. 13. The difference deduplication can be enabled or disabled by changing the write sequence without a need for copying data on a mode switch.

In certain cases, it may be beneficial to completely disable BCD and avoid the overhead of the address translation. To support bypassing BCD completely, hardware generally needs to support a non-deduplicated region 234 in the OS physical memory space 230. Memory accesses bypass the BCD translation logic when the OSPA (OS physical address, e.g., the address domain used for I/O requests to the I/O Module 12) points to the non-deduplicated region 234. The non-deduplicated region 234 can be indicated by adding a new bit to a page table entry. Then, an operating system or a hypervisor can choose if BCD is enabled or not for each page. Unlike the BCD light mode, dynamically transitioning a page between the BCD disabled mode and the BCD enabled mode is somewhat expensive in terms of memory accesses. Because there is no address translation in the BCD disabled mode, data generally needs to be copied before turning BCD off. Alternatively, an operating system may choose whether the deduplication should be used or not when allocating a page with no runtime switch.

To understand the effectiveness of compression and deduplication for a broad set of applications, the compression ratios may be first calculated from memory dumps of SPEC2006 and Transaction Processing Performance Council (TPC) (e.g., TPC-DS and TPC-H). Zero-initialized pages may then be removed from the memory dumps before the calculation.

For SPEC2006, workloads are analyzed for full execution. Each benchmark execution may be divided into ten parts, and a memory dump is extracted at the end of each part. A compression scheme may be applied to each memory dump, and the geomean over ten dumps is reported for each benchmark. Individual results are illustrated herein for benchmarks, and the geomean of SPECint, SPECfp. For TPC-DS and TPC-H, ten queries with the most memory usages in a database server are selected for each benchmark. Memory dumps are extracted when the memory usage is the highest. For example, a Compresso compression scheme may be combined with the deduplication because Compresso is based on the cache line compression.

The following table shows how the compressed memory size may be calculated for each scheme.

| Compression or deduplication schemes used for evaluation. | |
| --- | --- |
| Name | Compressed size |
| Compresso | Compressed lines (0, 8, 16, 32, or 64 B) + Translation (64 B per page) |
| Deduplication | Unique lines + Signatures + Ref counts + Translation (4 B per line) |
| Compresso Deduplication | Compressed unique lines (8, 16, 32, or 64 B) + Signatures + Ref counts + Translation (4 B per line) |
| BCD Deduplication | Unique bases + Unique differences (16, 32, or 48 B) + Signature + Ref counts + Translation (8 B per line) + Overflow |

The size generally includes all compression metadata in the memory 20 as well as compressed data. For Compresso, LinePacking is adopted with different sizes (e.g., 0B, 8B, 16B, 32B, and 64B). Compared to the original Compresso, 16B was added to provide better compression ratios. The translation overhead of LinePacking is 64B per page and the deduplication scheme uses 64B granularity with 1B signatures and 1B reference counts. The translation overhead is 4B per 64B block. For the naive combination, the hash table for deduplication may store compressed data in 8B, 16B, 32B, and 64B.

The deduplication embodiments herein are operable to leverage interline redundancy to deduplicate portions of data to expand memory deduplication and improve compression ratios (e.g., the ratio of logically available capacity to physical capacity). In some embodiments, the deduplication module 14 uses a hash value of parts of blocks as a bucket index to allocate similar blocks into the same bucket. For example, a bucket may include a full signature and one or more partial signatures for each entry in the base pointer table 16. A full signature is essentially a fingerprint (e.g., a hash) of a whole block. A partial signature is essentially fingerprint (e.g., a hash) of the part of a block. When two blocks are partially matched, the difference is stored in a difference array. The difference array may be operable to support different sizes of compressed or uncompressed differences. In this regard, LZC compression may be applied to the differences before they are stored.

EXEMPLARY EMBODIMENTS

In some embodiments, the deduplication module 14 may include interface circuitry for communicating with a hardware block or circuitry that sends read and write I/O requests to a memory device of the computer system, and interface circuitry for communicating with the memory 20. The deduplication module 14 may manage data structures (e.g., the base pointer table 16 and the difference pointer table 18) that are stored in the memory 20 for deduplication. For example, the base pointer table 16 may include a hash table for storing multiple base values. And, the difference pointer table 18 may include a difference hash table for storing multiple compressed or uncompressed difference values. The base pointer table 16 may store base pointers and the difference pointer table 18 may store difference pointers that indicate locations of the corresponding base values of data and the difference values of data in the hash tables, respectively. In some embodiments, an overflow region may be used for storing base or difference values that are not stored in the hash tables when the hash tables are full. And, the deduplication module 14 may determine whether a partially matched base value of data is stored in the base hash table using a hash of a specific part of an incoming block of data of a write I/O request. The deduplication module 14 may direct the I/O module 12 to store compressed and/or uncompressed difference data values between the partially matched base and the incoming block of data in the difference hash table.

In some embodiments, the deduplication module 14 is located in a processor system on a chip (SoC) or in the memory 20.

In some embodiments, the deduplication module 14 is operable to receive instructions for setting deduplication mine sizes, bit positions to decide a partial match, the number of base buckets in the base hash table, the number of the difference buckets in the difference hash table, the number of ways in one of the base buckets, the number of ways in one of the difference buckets, compressed difference sizes, hash functions for generating signatures, or hash functions for choosing buckets in the hash tables.

In some embodiments, the deduplication module 14 is configured to: receive instructions for defining at least one of the base hash table, the difference hash table, the translation table, or the overflow region.

In some embodiments, the deduplication module 14 is configured to: receive a write I/O request corresponding to an incoming block of data; calculate a hash value by performing a hash function on the specific part of the incoming data upon receiving the write I/O request; determine whether a partially matched or fully matched base is stored in the base bucket corresponding to the calculated hash value; store the incoming block of data in an empty way of the base bucket if there is no partially matched or fully matched base in the base bucket; retrieve a pointer of partially matched or fully matched base value if there is a partially matched or fully matched base in the base bucket; calculate the difference between the incoming data and partially matched base when a partially matched base is stored in the base hash table; compress the difference value if it is compressible; calculate a hash value by performing a hash function on the compressed or uncompressed difference; determine whether the compressed or uncompressed difference value is stored in the difference hash bucket corresponding to the calculated hash value; store the difference in an empty way of the difference bucket if the difference value is not stored in the difference bucket; retrieve the pointer of the stored difference value if the difference value is stored in the difference bucket; update pointers of the corresponding entry in the translation table; and update reference counters of the corresponding base and difference in the hash tables.

In some embodiments, the deduplication module 14 is configured to: calculate partial match and full match signatures by performing hash functions on the specific part of the incoming block data and the entire incoming block of data upon receiving a write request; compare the calculated signatures to the signatures of all ways in the chosen base bucket for finding a match quickly; calculate a signature by performing a hash function on the calculated difference value; and compare the calculated signature to the signatures of all ways in the chosen difference bucket for finding a match quickly.

In some embodiments, the deduplication module 14 is configured to: receive a read I/O request; retrieve a base pointer and a difference pointer in the corresponding entry of the translation table; retrieve stored base value and difference value, which are referenced by the pointers, from the hash tables; decompress the retrieved difference value if it is compressed; merge the base value and the decompressed difference value to calculate the originally written data; and return the calculated original data as a response of the read I/O request.

In some embodiments, the deduplication module 14 is configured to: track the statistics of deduplication results for write I/O requests including at least one of the number of bytes used to store base and difference that cannot be deduplicated, the number of memory accesses, or the current memory bandwidth; track the statistics of deduplication results for read I/O requests including at least one of the number of memory accesses or the read latency; and choose one of the deduplication modes based on the tracked information.

Any of the above embodiments herein may be rearranged and/or combined with other embodiments as a matter of design choice. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 13 illustrates a computing system 250 in which a computer readable medium 256 may provide instructions for performing any of the methods disclosed herein.

Furthermore, portions of the embodiments can take the form of a computer program product accessible from the computer readable medium 256 providing program code for use by or in connection with a computer or any instruction execution system. For the purposes of this description, the computer readable medium 256 can be any apparatus that can tangibly store the program for use by or in connection with the instruction execution system, apparatus, or device, including the computer system 250.

The medium 256 can be any tangible electronic, magnetic, optical, electromagnetic, infrared, or semiconductor system (or apparatus or device). Examples of a computer readable medium 256 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 250, suitable for storing and/or executing program code, can include one or more processors 252 coupled directly or indirectly to memory 258 through a system bus 260. The memory 258 can include local memory employed during actual execution of the program code, bulk storage, and cache memories which provide temporary storage of at least some program code in order to reduce the number of times code is retrieved from bulk storage during execution. Input/output or I/O devices 254 (including but not limited to keyboards, displays, pointing devices, etc.) can be coupled to the system either directly or through intervening I/O controllers. Network adapters may also be coupled to the system to enable the computing system 250 to become coupled to other data processing systems, such as through host systems interfaces 262, or remote printers or storage devices through intervening private or public networks. Modems, cable modem and Ethernet cards are just a few of the currently available types of network adapters.

What is claimed is:

1. A device, comprising:
a memory;
an Input/Output (I/O) module comprising a device, system, software or combination thereof, and configured to process a write I/O request to the memory, and to extract data of the write I/O request comprising a first cache line block, wherein the first cache line block is partially matched with a second cache line block stored in the memory; and
a data deduplication module comprising a device, system, software or combination thereof, and configured to access a table to identify a first portion of the first cache line block of the data of the write I/O request that is duplicated and stored at a first address of the memory, to assign a pointer to the first portion of the data in the table, to identify a second portion of the first cache line block of the data of the write I/O request that is not duplicated and not stored in the memory, and to direct the second portion of the data of the write I/O request to be written to a second address of the memory,
wherein the data deduplication module is configured to initialize a partition of the memory such that the memory comprises:
a translation table region comprising a base pointer table to store base pointers and a difference pointer table to store difference pointers,
a base array region that maintains base data comprising the duplicated data of a plurality of cache lines with base pointers pointing to the duplicated data, wherein the duplicated data comprises the first portion of the first cache line block of the data of the write I/O request;
a difference array region that maintains differing data of a plurality of cache lines with difference pointers pointing to the differing data wherein the differing data comprises the second portion of data of the first cache line block of the data of the write I/O request; and
an overflow region.

2. The device of claim 1, wherein:
the data deduplication module is further operable to lead-zero compress the second portion of the data of the write I/O request.

3. The device of claim 1, wherein:
the I/O module is further operable to process a read I/O request to the memory; and
the data deduplication module is further operable to locate the second portion of the data at the second address of the memory based on the read I/O request, to direct the I/O module to read the second portion of the data from the second address of the memory, to retrieve the pointer from the table, to locate the first portion of the data at the first address of the memory based on the pointer, to direct the I/O module to read the first portion of the data at the first address of the memory, and to direct the I/O module to link the first and second portions of the data,
wherein the I/O module is further operable to transfer the linked first and second portions of the data to fulfil the read I/O request.

4. The device of claim 3, wherein:
the data deduplication module is further operable to lead-zero decompress the second portion of the data before fulfilling the read I/O request.

5. The device of claim 1, wherein:
the data deduplication module is further operable to establish a size for the first portion of the data, and to compare the first portion of the data to data stored in the memory based on the size,
wherein the size of the first portion of the data is different from a size of the second portion of the data in the write I/O request.

6. The device of claim 1, wherein:
the data deduplication module is further operable to generate a hash value for the first portion of the data of the write I/O request, and to locate the first portion of the data of the write I/O request in the memory based on the hash value.

7. The device of claim 1, wherein:
the I/O module is further operable to process another write I/O request to the memory, and to extract the data of the other write I/O request; and
the data deduplication module is further operable to determine that the data of the other write I/O request is not stored in the memory, and to direct the I/O module to write the data of the other I/O request to the memory.

8. The device of claim 1, wherein:
the I/O module is further operable to process another write I/O request to the memory, and to extract the data of the other write I/O request; and
the data deduplication module is further operable to determine that all of the data of the other write I/O request is stored in the memory, and to assign another pointer to a third address in the memory where the data of the other write I/O request is stored.

9. The device of claim 1, wherein:
the I/O module is further operable to process another write I/O request to the memory, and to extract the data of the other write I/O request; and
the data deduplication module is further operable to access a table to identify that the other write I/O request includes the first portion of data that is stored at the first address of the memory, and to assign another pointer to the first portion of the data in the table.

10. The device of claim 1, wherein:
the data deduplication module is further operable to selectively disable data deduplication.

11. The device of claim 1, wherein the difference array region comprises a plurality of minimum size blocks configured to support different sizes of the differing data of a plurality of cache lines, and wherein size information is stored in a cache line.

12. The device of claim 1, wherein the data deduplication module is configured to provide deduplication granularity partition of the first cache line block such that the partially matched portion between the first cache line block and the second cache line block can be deduplicated.

13. A device, comprising:
a memory;
an Input/Output (I/O) module comprising a device, system, software or combination thereof, and configured to process a write I/O request to the memory, and to extract data of the write I/O request comprising a first cache line block, wherein the first cache line block is partially matched with a second cache line block stored in the memory; and
a data deduplication module comprising a device, system, software or combination thereof, and configured to access a table to identify a first portion of the first cache line block of the data of the write I/O request that is duplicated and stored at a first address of the memory, to assign a pointer to the first portion of the data in the table, to identify a second portion of the first cache line block of the data of the write I/O request that is not duplicated and not stored in the memory, and to direct the second portion of the data of the write I/O request to be written to a second address of the memory, wherein the data deduplication module is configured to provide one or more levels of deduplication granularity partition of the first cache line block wherein the deduplication granularity size is selected from 2B, 4B, 8B, 16B, or any combination thereof.

14. The device of claim 13, wherein:
the data deduplication module is further operable to lead-zero compress the second portion of the data of the write I/O request.

15. The device of claim 13, wherein:
the I/O module is further operable to process a read I/O request to the memory; and
the data deduplication module is further operable to locate the second portion of the data at the second address of the memory based on the read I/O request, to direct the I/O module to read the second portion of the data from the second address of the memory, to retrieve the pointer from the table, to locate the first portion of the data at the first address of the memory based on the pointer, to direct the I/O module to read the first portion of the data at the first address of the memory, and to direct the I/O module to link the first and second portions of the data,
wherein the I/O module is further operable to transfer the linked first and second portions of the data to fulfil the read I/O request.

16. The device of claim 15, wherein:
the data deduplication module is further operable to lead-zero decompress the second portion of the data before fulfilling the read I/O request.

17. The device of claim 13, wherein:
the data deduplication module is further operable to establish a size for the first portion of the data, and to compare the first portion of the data to data stored in the memory based on the size,
wherein the size of the first portion of the data is different from a size of the second portion of the data in the write I/O request.

18. The device of claim 13, wherein:
the data deduplication module is further operable to generate a hash value for the first portion of the data of the write I/O request, and to locate the first portion of the data of the write I/O request in the memory based on the hash value.

19. The device of claim 13, wherein:
the I/O module is further operable to process another write I/O request to the memory, and to extract the data of the other write I/O request; and
the data deduplication module is further operable to determine that the data of the other write I/O request is not stored in the memory, and to direct the I/O module to write the data of the other I/O request to the memory.

20. The device of claim 13, wherein:
the I/O module is further operable to process another write I/O request to the memory, and to extract the data of the other write I/O request; and
the data deduplication module is further operable to determine that all of the data of the other write I/O request is stored in the memory, and to assign another pointer to a third address in the memory where the data of the other write I/O request is stored.

21. The device of claim 13, wherein:
the I/O module is further operable to process another write I/O request to the memory, and to extract the data of the other write I/O request; and
the data deduplication module is further operable to access a table to identify that the other write I/O request includes the first portion of data that is stored at the first address of the memory, and to assign another pointer to the first portion of the data in the table.

22. The device of claim 13, wherein:
the data deduplication module is further operable to selectively disable data deduplication.

23. The device of claim 13, wherein the data deduplication module is configured to initialize a partition of the memory such that the memory comprises:
a translation table region comprising a base pointer table to store base pointers and a difference pointer table to store difference pointers,
a base array region that maintains base data comprising the duplicated data of a plurality of cache lines with base pointers pointing to the duplicated data, wherein the duplicated data comprises the first portion of the first cache line block of the data of the write I/O request;
a difference array region that maintains differing data of a plurality of cache lines with difference pointers pointing to the differing data wherein the differing data comprises the second portion of data of the first cache line block of the data of the write I/O request; and
an overflow region.

24. The device of claim 13, wherein the difference array region comprises a plurality of minimum size blocks configured to support different sizes of the differing data of a plurality of cache lines, and wherein size information is stored in a cache line.

25. The device of claim 13, wherein the data deduplication module is configured to provide deduplication granularity partition of the first cache line block such that the partially matched portion between the first cache line block and the second cache line block can be deduplicated.

26. A device, comprising:
a memory;
an Input/Output (I/O) module comprising a device, system, software or combination thereof, and configured to process a write I/O request to the memory, and to extract data of the write I/O request comprising a first cache line block, wherein the first cache line block is partially matched with a second cache line block stored in the memory; and
a data deduplication module comprising a device, system, software or combination thereof, and configured to access a table to identify a first portion of the first cache line block of the data of the write I/O request that is duplicated and stored at a first address of the memory, to assign a pointer to the first portion of the data in the table, to identify a second portion of the first cache line block of the data of the write I/O request that is not duplicated and not stored in the memory, and to direct the second portion of the data of the write I/O request to be written to a second address of the memory,
wherein the data deduplication module is configured to initialize a partition of the memory such that the memory comprises:
a translation table region comprising a base pointer table to store base pointers and a difference pointer table to store difference pointers, a base array region that maintains base data comprising the duplicated data of a plurality of cache lines with base pointers pointing to the duplicated data, wherein the duplicated data comprises the first portion of the first cache line block of the data of the write I/O request;

a difference array region that maintains differing data of a plurality of cache lines with difference pointers pointing to the differing data wherein the differing data comprises the second portion of data of the first cache line block of the data of the write I/O request; and an overflow region, wherein the difference array region comprises a plurality of minimum size blocks configured to support different sizes of the differing data of a plurality of cache lines, and wherein size information is stored in a cache line.

* * * * *